(12) United States Patent
Chambers

(10) Patent No.: US 11,539,084 B2
(45) Date of Patent: Dec. 27, 2022

(54) WATER LOSS SEPARATORS USED WITH LEAD ACID BATTERIES, SYSTEMS FOR IMPROVED WATER LOSS PERFORMANCE, AND METHODS OF MANUFACTURE AND USE THEREOF

(71) Applicant: Daramic, LLC, Charlotte, NC (US)

(72) Inventor: Jeffrey K. Chambers, Philpot, KY (US)

(73) Assignee: Daramic, LLC, Charlotte, NC (US)

( * ) Notice: Subject to any disclaimer, the term of this patent is extended or adjusted under 35 U.S.C. 154(b) by 72 days.

(21) Appl. No.: 16/878,655

(22) Filed: May 20, 2020

(65) Prior Publication Data

US 2020/0280107 A1    Sep. 3, 2020

Related U.S. Application Data

(62) Division of application No. 15/959,376, filed on Apr. 23, 2018, now Pat. No. 10,673,099, which is a
(Continued)

(51) Int. Cl.
*H01M 10/42* (2006.01)
*H01M 4/62* (2006.01)
(Continued)

(52) U.S. Cl.
CPC ......... *H01M 10/4235* (2013.01); *H01M 4/62* (2013.01); *H01M 4/628* (2013.01);
(Continued)

(58) Field of Classification Search
CPC .... H01M 10/4235; H01M 4/62; H01M 4/628; H01M 10/06; H01M 10/12; H01M 50/40;
(Continued)

(56) References Cited

U.S. PATENT DOCUMENTS 3,967,978 A    7/1976  Honda et al.
4,440,838 A *  4/1984  Schmidt ............... H01M 50/44
                                                     429/250
(Continued)

FOREIGN PATENT DOCUMENTS

WO    WO201005840    5/2010
WO    WO2010058240   5/2010
WO    WO2014151991   9/2014

*Primary Examiner* — Stewart A Fraser
(74) *Attorney, Agent, or Firm* — Hammer & Associates, P.C.

(57) ABSTRACT

In at least select embodiments, the instant disclosure is directed to new or improved battery separators, components, materials, additives, surfactants, lead acid batteries, systems, vehicles, and/or related methods of production and/or use. In at least certain embodiments, the instant disclosure is directed to surfactants or other additives for use with a battery separator for use in a lead acid battery, to battery separators with a surfactant or other additive, and/or to batteries including such separators. In at least certain select embodiments, the instant disclosure relates to new or improved lead acid battery separators and/or systems including improved water loss technology and/or methods of manufacture and/or use thereof. In at least select embodiments, the instant disclosure is directed toward a new or improved lead acid battery separator or system with one or more surfactants and/or additives, and/or methods for constructing lead acid battery separators and batteries with such surfactants and/or additives for improving and/or reducing water loss from the battery.

10 Claims, 1 Drawing Sheet

Related U.S. Application Data division of application No. 15/054,504, filed on Feb. 26, 2016, now Pat. No. 9,979,054.

(60) Provisional application No. 62/121,120, filed on Feb. 26, 2015.

(51) Int. Cl.
*H01M 50/40* (2021.01)
*H01M 50/449* (2021.01)
*H01M 10/12* (2006.01)
*H01M 50/411* (2021.01)
*H01M 50/431* (2021.01)
*H01M 10/06* (2006.01)

(52) U.S. Cl.
CPC .......... *H01M 10/06* (2013.01); *H01M 10/12* (2013.01); *H01M 50/40* (2021.01); *H01M 50/411* (2021.01); *H01M 50/431* (2021.01); *H01M 50/449* (2021.01); *H01M 2220/20* (2013.01); *Y02E 60/10* (2013.01)

(58) Field of Classification Search
CPC . H01M 50/411; H01M 50/431; H01M 50/449
See application file for complete search history.

(56) References Cited

U.S. PATENT DOCUMENTS

| | | |
|---|---|---|
| 6,689,509 B2 | 2/2004 | Zucker |
| 6,703,161 B2 | 3/2004 | Zucker |
| 7,147,972 B2 | 12/2006 | Fitter et al. |
| 8,592,089 B2 | 11/2013 | La et al. |
| 2002/0102467 A1 | 8/2002 | Fitter |
| 2011/0229750 A1 | 9/2011 | McLellan et al. |
| 2012/0070713 A1 | 3/2012 | Whear |
| 2012/0070747 A1 | 3/2012 | Whear et al. |
| 2012/0094183 A1* | 4/2012 | Deiters ............... H01M 50/411 429/246 |
| 2014/0255752 A1 | 9/2014 | Miller et al. |
| 2016/0028060 A1* | 1/2016 | Pekala ................. H01M 50/411 429/250 |
| 2016/0126522 A1 | 5/2016 | Mittal et al. |

* cited by examiner

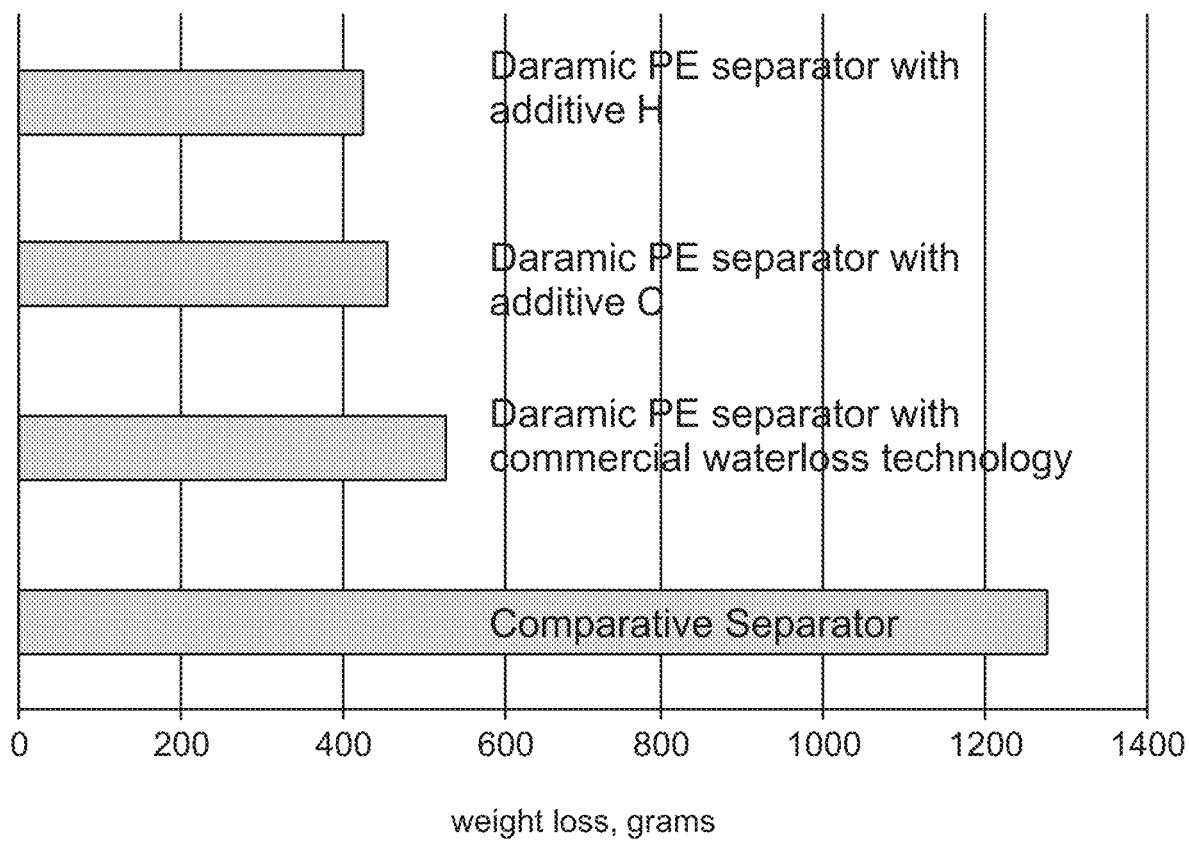

WATER LOSS SEPARATORS USED WITH LEAD ACID BATTERIES, SYSTEMS FOR IMPROVED WATER LOSS PERFORMANCE, AND METHODS OF MANUFACTURE AND USE THEREOF

CROSS-REFERENCE TO RELATED APPLICATIONS

This Divisional Application claims priority to U.S. Divisional application Ser. No. 15/959,376, filed Apr. 23, 2018, which claims priority to U.S. application Ser. No. 15/054,504 filed Feb. 26, 2016, now U.S. Pat. No. 9,979,054, issued on May 22, 2018, which claimed priority of U.S. Provisional Application No. 62/121,120, filed Feb. 26, 2015, both of which are incorporated herein by reference in its entirety.

FIELD OF THE INVENTION

In at least select embodiments, the instant disclosure or invention is directed to new or improved battery separators, components, materials, lead acid batteries, systems, and/or related methods of production and/or use. In at least certain embodiments, the instant disclosure or invention is directed to surfactants or other additives for use with a battery separator for use in a lead acid battery, to battery separators with a surfactant or other additive, and/or to batteries including such separators, and/or to products, devices or vehicles including such batteries. In at least certain select embodiments, the instant disclosure relates to new or improved lead acid battery separators and/or batteries and/or systems and/or vehicles including improved water loss technology and/or methods of manufacture and/or use thereof. In at least select embodiments, the instant disclosure is directed toward a new or improved lead acid battery separator or system with one or more surfactants and/or additives, and/or methods for constructing lead acid battery separators and batteries with such surfactants and/or additives for improving and/or reducing water loss from the battery.

BACKGROUND OF THE INVENTION

Lead acid batteries have evolved, over time, as the demands for a source of mobile electric power have grown. There are two main types of lead acid batteries: flooded lead acid batteries and VRLA (valve regulated lead acid) batteries. The instant disclosure may be particularly useful for flooded batteries, which are commonly used all over the world. A newer type of flooded lead acid battery is an EFB battery, or an enhanced flooded battery. For example, the new, ever growing requirements for Stop Start car technology demands a better battery which may be the "enhanced" flooded battery, or EFB.

Water loss in lead acid batteries is a known problem (loss of water from the electrolyte due to electrolysis producing hydrogen and oxygen gas that vents from the battery) and may occur for many different reasons. For example, water loss may occur in lead acid batteries as the overvoltage of hydrogen is exceeded at the electrodes. This may be typical and may occur to some extent as the electrochemical mechanism dictates. The effects of water loss may be greatly amplified in climates with sustained high temperature. Water loss has been identified as a major contributor to the following critical failure modes in lead acid batteries: plate dehydration, which may lead to battery failure; dryout in a sealed VRLA battery, which may lead to potential thermal runaway; negative plate sulfation, which may lead to reduced charge acceptance and/or reduced cycle life; and/or increased specific gravity of electrolyte, which may lead to negative plate sulfation and/or positive grid corrosion.

Water loss in a lead acid battery can be seen through: reduced level of electrolyte leading to dryout, exposing welds, plates and connections to corrosion and causing early failure; increasing electrolyte acid concentration, reduced capacity, negative plate sulfation, positive grid corrosion leading to early failure; and/or outgassing of $H_2$ and $O_2$ gasses, possibly creating an exposure and handling hazard and requiring venting. As such, reducing water loss in lead acid batteries may help eliminate: plate dehydration leading to early capacity loss and shortened life; negative plate sulfation, reducing life; and/or positive grid corrosion, reducing performance by robbing CCA (cold cranking amperage) and capacity and life. Water loss from lead acid batteries may be mainly due to electrolysis and subsequent gassing of hydrogen and oxygen, which may be more apparent in high temperature climates or applications.

EFBs may suffer from any of these water loss scenarios, including evaporation and electrolysis of water. Water loss, whether through evaporation and/or electrolysis, is commonly known to lower the performance and/or life of the EFB. As such, many methods have been developed to combat this drawback, including VRLA/AGM type batteries. However, even in a sealed VRLA/AGM battery, for example, the potential for dryout is present, and a potential thermal runaway could occur because of water loss. Thus, it can be said that various known and/or already-developed methods of combatting water loss in lead acid batteries may not provide all of the desired improvement in reduction in water loss and may require high costs that may not match the value brought forth by various developed methods.

As such, there is clearly a need to develop lead acid batteries and systems and vehicles including such lead acid batteries with improved water loss performance, and/or the ability to reduce evaporation and/or electrolysis of water in a flooded lead acid battery that is cost effective.

SUMMARY OF THE INVENTION

The battery separator of a flooded lead acid battery is a component that divides or "separates" the positive electrode from the negative electrode within a lead acid battery cell. A battery separator may have two primary functions. First, a battery separator should keep the positive electrode physically apart from the negative electrode in order to prevent any electronic current passing between the two electrodes. Second, a battery separator should permit an ionic current between the positive and negative electrodes with the least possible resistance. A battery separator can be made out of many different materials, but these two opposing functions have been met well by a battery separator being made of a porous nonconductor (such as porous or microporous polyolefin).

Various battery separators have been developed over time to try and combat water loss in a flooded lead acid battery. By way of example only, U.S. Pat. Nos. 6,703,161 and 6,689,509 (both of which are incorporated by reference herein in their entireties) mention combatting water loss by using a battery separator of a larger pore size. Additionally, U.S. Patent Publication No. 2014/0255752, which is incorporated by reference herein in its entirety, describes using a diffusive mat to protect against water loss in a battery, while other ways to approach water loss reduction in batteries are described in U.S. Patent Publication Nos. 2012/0070747 and 2012/0070713 (both of which are incorporated by reference herein in their entireties).

Other battery separators have been developed to help improve the performance and/or life of the battery. One such disclosure includes the separators that contain one or more additives as disclosed in U.S. Patent Publication No. 2012/0094183, which is incorporated by reference herein in its entirety. The separators with the additives (additives such as alkoxylated alcohol additives) described by that patent publication help to reduce water loss in a flooded lead acid battery. And further reduction in water loss in a flooded lead acid battery is even more desirable. Hence the present disclosure seeks to further improve the water loss reduction for a flooded lead acid battery and in at least certain embodiments reduces water loss while maintaining other separator and/or battery properties.

The instant disclosure is designed to address at least certain aspects of the problems or needs discussed above by providing new and/or improved additives for use with battery separators for use in flooded lead acid batteries, such that the resulting lead acid batteries or systems exhibit improved water loss, or reduced water loss, compared with known lead acid batteries or systems.

In accordance with at least selected embodiments, the instant invention addresses the above mentioned needs, issues and/or problems and provides new or improved battery separators for lead acid batteries. In general, the instant disclosure provides new or improved lead acid battery separators and/or methods of manufacture and/or use thereof. In at least select embodiments, the instant disclosure provides one or more additives or surfactants for a battery separator and/or for a lead acid battery system, as well as methods for constructing lead acid battery separators and/or battery systems including such additives or surfactants for improving and/or reducing water loss for a lead acid battery. In one embodiment, a method of improving and/or reducing water loss of a lead acid battery may include providing a separator as well as an additive or surfactant where the additive or surfactant may improve and/or reduce water loss for the system.

BRIEF DESCRIPTION OF THE DRAWING

FIG. 1 includes a graph showing the reduction in water loss for batteries or systems incorporating one or more water loss agents or additives according to various embodiments, aspects or objects of the invention described herein.

DETAILED DESCRIPTION OF THE INVENTION

In at least select embodiments, the instant disclosure is directed to new or improved battery separators, components, materials, additives, lead acid batteries, systems, vehicles, and/or related methods of production and/or use. In at least certain embodiments, the instant disclosure is directed to surfactants or other additives for use with a battery separator for use in a lead acid battery, to battery separators with a surfactant or other additive, and/or to batteries including such separators. In at least certain select embodiments, the instant disclosure relates to new or improved lead acid battery separators and/or systems including improved water loss technology and/or methods of manufacture and/or use thereof. In at least select embodiments, the instant disclosure is directed toward a new or improved lead acid battery separator or system with one or more surfactants and/or additives, and/or methods for constructing lead acid battery separators and batteries with such surfactants and/or additives for improving and/or reducing water loss from the battery.

The present disclosure provides a surfactant or additive to be used in conjunction with a lead acid battery separator, the modified separator, and a lead acid battery or battery system or vehicle having such a separator with a surfactant or an additive. The surfactant may be for reducing water loss (typically water vapor) from the lead acid battery. As such, the instant disclosure provides a lead acid battery with reduced or improved water loss.

Surfactants, as used herein, may refer to compounds that lower the surface tension (or interfacial tension) between two liquids or between a liquid and a solid. As such, the instant surfactants may act as detergents, wetting agents, emulsifiers, foaming agents, anti-foaming agents, dispersants, in particular, water loss agents, the like, and/or combinations thereof. The various surfactants of the instant disclosure may be various surfactants that can reduce and/or improve the water loss of the lead acid battery. The various surfactants may reduce and/or improve the water loss of the lead acid battery by various means. As examples, and clearly not limited thereto, the various surfactants or additives described herein may reduce the float current, and/or may reduce the level of gas evolution on charge, which may result in loss of water from $H_2$ gas escape from the electrolyte. As such, the various surfactants or additives used herein may be designed to tailor the functionality to provide a desired balance of wetting, electrical resistance, ion transfer, overvoltage protection, the like, and/or combinations thereof.

In select embodiments, the various surfactants or additives used herein may improve separator life within the environment of the lead acid battery.

In select embodiments, the various surfactants or additives used herein may be stable under conditions required to manufacture a UHMWPE (ultrahigh molecular weight polyethylene) battery separator.

In select embodiments, the various surfactants or additives used herein may exhibit some solubility characteristics in the process oil. In addition, the various surfactants or additives described herein may be soluble in water and/or the electrolyte and may be coated or spray applied to the separator surface.

In select embodiments, the various surfactants or additives used herein may be added any time within the separator manufacturing process. As such, the various surfactants or additives described herein may be applied within the battery or other components as a supplement to the separator or in place thereof. As examples, and clearly not limited thereto, the various surfactants and additives described herein may be provided with the electrolyte as a pre-mix or added as a stand-alone to the cell, the surfactant or additive may be coated on the separator with a water based application after removal of processing oil to achieve the desired concentration, the surfactant or additive may be mixed with the resin/oil/silica and/or the oil and/or solvent and infused into the separator during normal manufacturing steps, the surfactant or additive may be mixed with processing oil and remain in the separator at the desired level through the end of the process, the surfactant or additive may be used as a replacement for the normal residual oil left within a separator, the like, and/or combinations thereof. The various surfactants or additives used herein may be provided in various amounts in or on the separator to achieve the desired reduction or improvement in water loss. In select embodiments, the surfactant or additive may be between 0.5 to 60% of the processing oil and PE, silica. In other select embodiments, the surfactant or additive may be between 0.5 to 40%, in some embodiments, 1 to 20%, in other embodiments, 2 to 6% of the processing oil and PE, silica. In other embodiments, the surfactant may be approximately 5% of the processing oil and PE, silica.

In select embodiments, the surfactants or additives described herein may be included with, or in place of, another additive to the separator. Such other additive could include, by way of example only, an alkoxylated alcohol additive, such as those disclosed in U.S. Patent Publication No. 2012/0094183 (already incorporated by reference herein).

Also, in various embodiments, the battery separator may be based on thermoplastic, such as a polyolefin or an ultra-high molecular weight polyolefin, such as one (such as polyethylene) with an average molecular weight of at least 800,000, in some embodiments, 800,000 to more than 7,000,000 and so forth.

In select embodiments, the various surfactants and/or additives used herein may be further optimized to improve and/or reduce water loss. For example, various concentrations and formulae can be optimized, and additional additives could be added to the overall lead acid battery system, such as, by way of example only, zinc, zinc sulfate, bismuth, silver, selenium, cadmium, the like, and/or combinations thereof, for optimizing the water loss performance.

Surfactants may often be characterized by their hydrophilic/lipophilic balance or HLB. High HLB values indicate good water, or polar solvent solubility, of the surfactant while low HLB values are indicative of good solubility in nonpolar systems, such as oil.

The water loving, or hydrophilic character, of a surfactant is determined by the polarity of the head group. Increasing the length of the fatty tail or of the head group may decrease the HLB.

In various embodiments of the present invention, the amount of water loss in the system is reduced by selecting a surfactant and/or an additive, possibly in combination with other water loss technologies, while optimizing the HLB number of the surfactant, emulsifier, additive or other chemical system.

In select embodiments, the surfactant or additive may be a low or very low HLB surfactant or additive. For example, the HLB value may be less than 5, in some embodiments, less than 4, in some embodiments, less than 3, in some embodiments, less than 2.5, in some embodiments less than 2, in some embodiments, less than 1.5, and in some embodiments, about 1, and so forth. In select embodiments, the low HLB surfactant may be created from a hydrocarbon with functional groups. It has surprisingly been found as part of the present invention that although various types of surfactants and additives may have a low or very low HLB value (by way of example only, less than 2.5 or even about 1), not all surfactants or additives are appropriate for use with a battery separator for a lead acid battery, and, importantly, not all surfactants and additives having a low HLB value lead to a battery separator that creates reduced water loss for a lead acid battery. Thus, in the course of the present invention, systems are created that use surfactants or additives that surprisingly and unexpectedly lead to improvement, and in many cases, significant improvement in water loss (reduction of water loss) when used in conjunction with a battery separator for a lead acid battery.

In select embodiments, the surfactant or additive may be a low foam surfactant. Additionally, in select embodiments, the surfactant or additive may be chosen to have a low TOC (total organic carbon or total oxidizable compounds).

In select embodiments, the surfactant may have linear hydrophobic groups and ethylene oxide and propylene oxide monomers.

In select embodiments, the surfactant may be a nonionic surfactant. The nonionic surfactant may be a nonionic surfactant for reducing and/or improving water loss, including, but not limited to: a methallyl-capped nonionic surfactant, the like, and/or combinations thereof. By way of example only, the use of a methallyl-capped nonionic surfactant may provide a lead acid battery system with surprisingly or unexpectedly high water loss results using a battery separator treated with such a surfactant when compared with other known lead acid battery systems. In other embodiments, the surfactant may be a liquid surfactant and may contain ethylene oxide (EO) and propylene oxide (PO) block copolymers, and may, for example, have a low or very low HLB value of about 1. Such a surfactant or additive may provide a lead acid battery system with surprisingly or unexpectedly high water loss results using a battery separator treated with such a surfactant when compared with other known battery systems.

A lead acid battery may be provided, made or manufactured according to the instant disclosure with any of the various embodiments of the various surfactants and/or additives as shown and/or described herein. The lead acid battery, like a flooded lead acid battery, or an EFB, may be improved with any of the various embodiments of the surfactants and/or additives as shown and/or described herein. The improvements of the lead acid battery with any of the various embodiments of the surfactant as shown and/or described herein may include, but are not limited to, having reduced and/or improved water loss.

The instant disclosure also provides a method of reducing water loss of a lead acid battery. The method may include providing one or more surfactants or additives according to any of the various embodiments shown and/or described herein. In select embodiments, the method of reducing water loss of a lead acid battery may include reducing water and/or vapor loss from an energy storage device. In select embodiments of the instant method of reducing water loss of a lead acid battery, the surfactant or additive may be provided in or on the battery separator. In select embodiments of the instant method of reducing water loss of a lead acid battery, the surfactant or additive may be provided in or with another additive for improving water loss or reducing water loss in a lead acid battery, where such other additive could include zinc, zinc sulfate, bismuth, silver, tin, selenium, cadmium, germanium, the like, and/or combinations thereof, for optimizing the water loss performance. Such other additive may be added to the electrolyte in the battery system. Additionally, such other additive may be added to a coating solution containing the surfactant or additive according to the present invention, to be coated onto a battery separator for a lead acid battery. In various embodiments, a coating of the present invention may be roller coated onto a separator, immersion coated onto a separator, spray coated onto a separator, or applied in some other fashion.

In various embodiments of the present invention, the addition of a water loss additive or surfactant may unexpectedly yield a reduction in water loss of more than 10%, in some embodiments, more than 25%, in some embodiments, more than 40%, and in some select embodiments more than 50% compared with known lead acid battery systems. Additionally, the systems of the present invention are optimized such that there is little or no impact on the electrical resistance of the system. The systems described herein are designed to extend the life cycle of a battery as well as reserve capacity and help with optimizing CCA.

EXAMPLES

In various lab tests, laboratory flooded lead acid batteries were assembled, and water loss testing was performed to determine the benefits of various embodiments according to the present invention. A comparative separator was used as a control, and that separator was a synthetic fiber-based flooded lead acid battery separator. FIG. 1 is a bar graph of water weight loss in grams over an 84 day period for various example surfactants and/or additives according to the instant disclosure (see the top two bars with separators bearing additive H, a surfactant comprising ethylene oxide and propylene oxide block copolymers, and additive C, a low foam methallyl-capped nonionic surfactant). The results show that various embodiments of the surfactants and/or additives are useful in improving and/or reducing water loss.

The instant disclosure provides new or improved surfactants and/or additives for separators to be used in conjunction with a lead acid battery, lead acid batteries with improved battery separators, lead acid battery systems with improved water loss technology, and/or methods of manufacture and/or use thereof. In at least select embodiments, the instant disclosure provides new or improved surfactants and/or additives for use in or on a battery separator for a lead acid battery. In at least select embodiments, the instant disclosure provides new or improved separators with methods of manufacture and/or use thereof. In at least select embodiments, the instant disclosure provides a new or improved lead acid battery with a separator that reduces the water loss from the battery. In at least select embodiments, a method of reducing the water loss of a lead acid battery may include providing an improved separator to the lead acid battery.

In at least select embodiments, the instant disclosure or invention is directed to new or improved battery separators, components, materials, additives, surfactants, lead acid batteries, systems, and/or related methods of production and/or use. In at least certain embodiments, the instant disclosure or invention is directed to surfactants or other additives for use with a battery separator for use in a lead acid battery, to battery separators with a surfactant or other additive, and/or to batteries including such separators, and/or to products, devices or vehicles including such batteries. In at least certain select embodiments, the instant disclosure relates to new or improved lead acid battery separators and/or batteries and/or systems and/or vehicles including improved water loss technology and/or methods of manufacture and/or use thereof. In at least select embodiments, the instant disclosure is directed toward a new or improved lead acid battery separator or system with one or more surfactants and/or additives, and/or methods for constructing lead acid battery separators and batteries with such surfactants and/or additives for improving and/or reducing water loss from the battery.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein. Many other modifications and variations of the present invention are possible to the skilled practitioner in the field in light of the teachings herein. It is therefore understood that, within the scope of the claims, the present invention can be practiced other than as herein specifically described.

The invention claimed is:

1. A battery separator for reduced water-loss comprising a surfactant in or on the battery separator, wherein the surfactant comprises an ethylene oxide/propylene oxide block copolymer, having an HLB from 1 to 1.5 and at least one of metallic zinc, bismuth, silver, selenium, and cadmium in or on the battery separator.

2. The battery separator of claim 1, wherein the surfactant further comprises a non-ionic surfactant.

3. The battery separator of claim 2, wherein the non-ionic surfactant comprises a methallyl-capped non-ionic surfactant.

4. The battery separator of claim 1, wherein the separator comprises a microporous membrane or a microporous membrane laminated to a nonwoven.

5. The battery separator of claim 4, wherein the battery separator comprises polyethylene (PE), silica, and processing oil, and the surfactant is present in an amount of 0.5 to 60% of the PE, silica, and processing oil.

6. The battery separator of claim 5, wherein the surfactant is present in an amount of 1 to 20% of the PE, silica, and processing oil.

7. The battery separator of claim 1, wherein the battery separator comprises polyethylene (PE), silica, and processing oil, and the surfactant is present in an amount of 0.5 to 60% of the PE, silica, and processing oil.

8. The battery separator of claim 7, wherein the surfactant is present in an amount of 1 to 20% of the PE, silica, and processing oil.

9. The battery separator of claim 1, further comprising an alkoxylated alcohol additive in or on the battery separator.

10. A battery comprising the battery separator of claim 1, wherein the battery exhibits reduced water-loss.

* * * * *